Dec. 2, 1958   F. B. PORTEOUS ET AL   2,862,589
FRICTION DRIVE MECHANISM

Filed Sept. 20, 1954   3 Sheets-Sheet 1

INVENTORS
FREDERICK B. PORTEOUS
BY & JOHN A. FOSTER
Bosworth, Sessions,
Herrstrom and Williams
ATTORNEYS INVENTORS
FREDERICK B. PORTEOUS
& JOHN A. FOSTER
BY Booworth, Sessions,
Herrstrom and Williams
ATTORNEYS Dec. 2, 1958  F. B. PORTEOUS ET AL  2,862,589
FRICTION DRIVE MECHANISM
Filed Sept. 20, 1954  3 Sheets-Sheet 3

INVENTORS
FREDERICK B. PORTEOUS
& JOHN A. FOSTER
BY
Bosworth, Sessions,
Herrstrom and Williams
ATTORNEYS

United States Patent Office 2,862,589
Patented Dec. 2, 1958

2,862,589
FRICTION DRIVE MECHANISM

Frederick B. Porteous and John A. Foster, Hastings, Mich., assignors to E. W. Bliss Company, Canton, Ohio, a corporation of Delaware Application September 20, 1954, Serial No. 456,946

9 Claims. (Cl. 192—18)

The present invention relates to a friction drive mechanism in which connection between the driving and driven members is effected through a plurality of interdisposed friction plates and is more particularly directed to a combination of two such units, one of which functions as a clutch and the other as a brake.

Composite clutch and brake units in which the brake is set when the clutch is released and the brake released upon actuating the clutch generally represent constructions which are well known in the art. Such units consist of a series of brake plates and a series of clutch plates and a driven member with plates adapted to engage the brake and clutch respectively. Spring members are normally provided to engage the brake upon release of a fluid supply to a piston mechanism engaging the clutch and, similarly, the clutch is engaged by an applied force of sufficient magnitude to overcome the springs and release the brake at the time the friction clutch drive is instituted.

Friction drive assemblies of this type are frequently mounted on the end of the shaft of a metalworking press and in order to reduce the amount of the shaft overhang, it is desirable to provide a combination clutch, brake and flywheel structure that can be mounted on the shaft without the necessity of using bearings at the outer end of the structure to support the overhanging shaft. It is further desirable to make the structure as compact as possible to reduce the amount of overhang and to provide a self-contained assembly which can be placed upon or removed from the shaft as a unit.

It is, therefore, a chief object of the present invention to provide an improved clutch and brake assembly as indicated above which will be of simple construction and which will occupy a minimum amount of space. Another object of the invention is to provide a compact, substantially self-contained unit which may be easily taken apart for maintenance and repair. Still a further object of the invention is to provide a unit in which the clutch and brake plates and the actuating piston are substantially in circumferential alignment with each other along the shaft axis, that is to say, where each is substantially the same radial distance from the shaft axis. Still an additional object of the invention is to provide a construction in which compactness is obtained by mounting the fluid piston cylinder mechanism on one side of the flywheel web and the clutch friction plate mechanism immediately adjacent on the opposite side of the web. Still another object of the invention is to provide a unit in which a central sleeve supports the clutch and brake and also supports the flywheel and piston rotatably thereon. A still further object of the invention is to provide an improved manner of supplying fluid to actuate the piston cylinder mechanism from a supply position at the axis of the shaft and beyond its end.

To the accomplishment of the foregoing and related ends, said invention, then, consists of the means hereinafter fully described and particularly pointed out in the claims, the annexed drawings and the following description setting forth in detail certain structure embodying the invention, such disclosed means constituting, however, but one of various structural forms in which the principle of the invention may by used.

Figure 3:
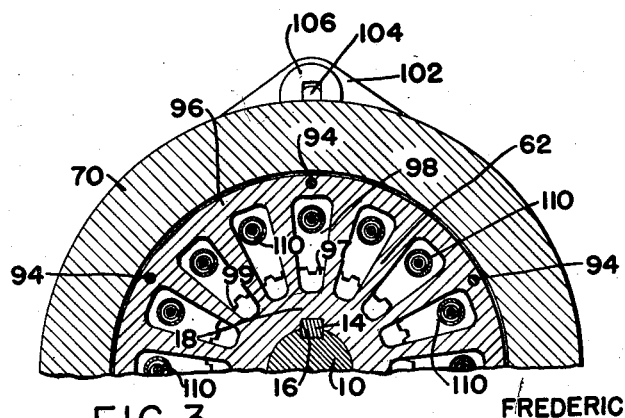
Figure 2:
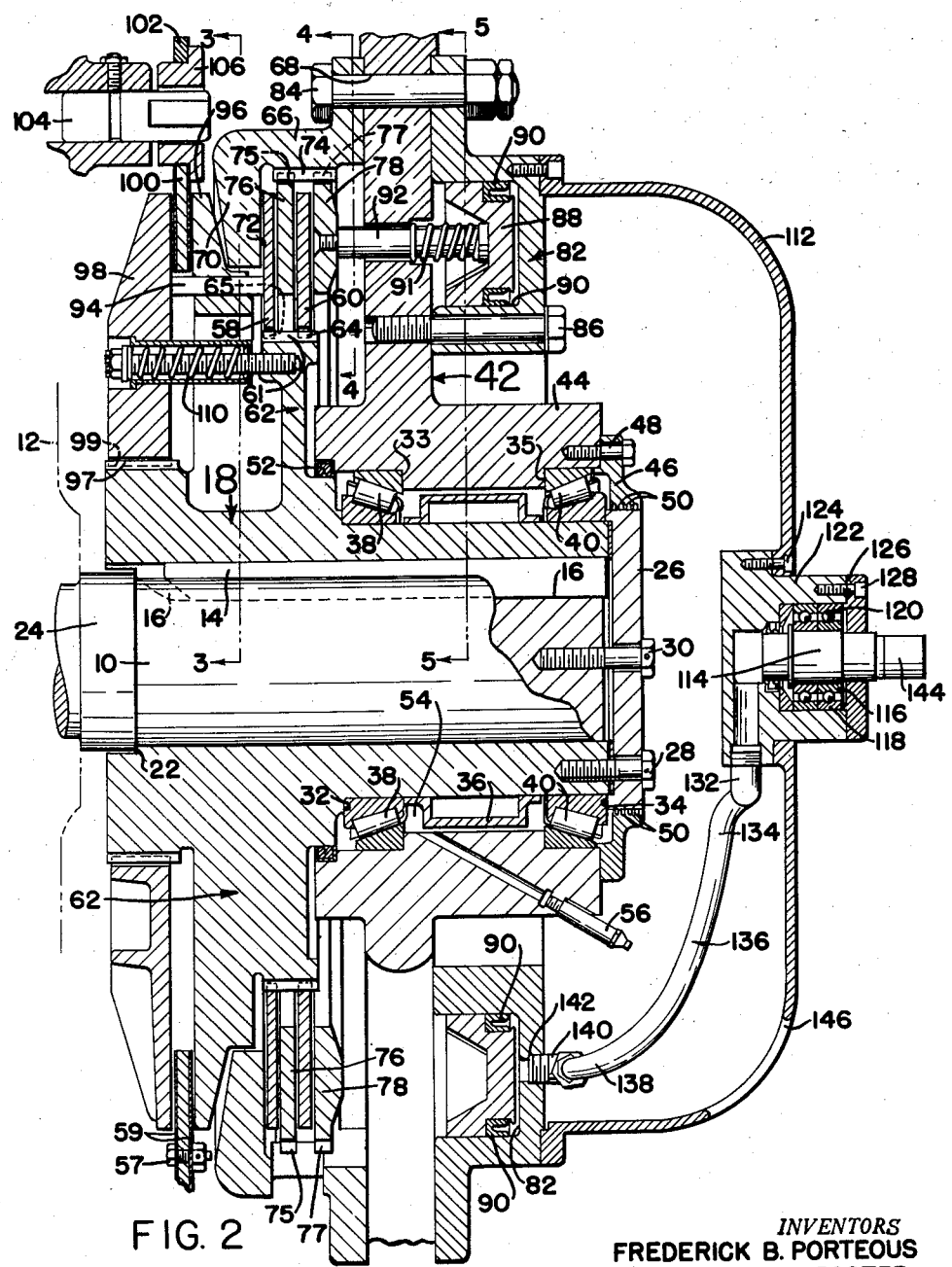
Figure 2 is a transverse section through the unit as indicated by the line 2—2 on Figure 1.
Figure 5:
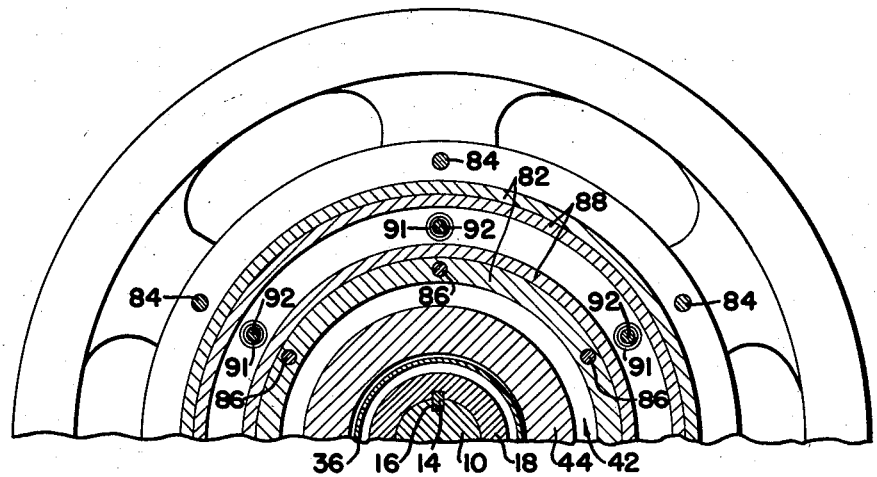
Figure 4:
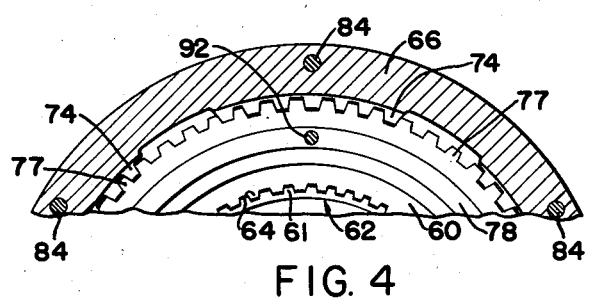

Figures 3, 4 and 5 are partial sections normal to the drive shaft axis as indicated respectively by the lines 3—3, 4—4 and 5—5 on Figure 2.

Referring now particularly to Figure 2, there is provided the usual drive shaft 10 which is journaled for rotation in a frame 12 of the machine, usually a metal working press. The shaft 10 may carry a crank eccentric which, through a suitable connecting link or pitman, reciprocates the press platen in a manner well known in the art.

Secured to the shaft 10 by a key 14 in shaft keyway 16 is a sleeve 18. A shoulder 22 on the sleeve 18 engages an annular enlargement 24 of the shaft 10 to limit motion of the sleeve toward the left as shown in Figure 2. At the free end of the shaft there is provided an end plate 26 which is bolted to the sleeve 18 by suitable bolts 28 and to the end of the shaft 10 by a centrally located bolt 30 to limit the motion of the sleeve toward the right. Shoulder 32 of sleeve 18 and shoulder 33 of flywheel 42 serve to position and retain the races of taper bearing 38, and shoulder 34 of end plate 26 and shoulder 35 of flywheel 42 serve to position and retain the races of taper bearing 40. Sleeve 36 is used as a filler piece to prevent packing up of grease on the flywheel hub.

The flywheel, indicated at 42, is provided with a central hub 44 and is rotatably carried on the sleeve 18 by the aforementioned conventional tapered roller bearings 38 and 40 and their associated races. To prevent the lubricant for the bearings from leaking out at the end of the shaft, a ring 46 is provided, bolted to the hub 44 by bolts 48 and provided with sealing rings 50 adjacent the outer peripheral surface of the plate 26. As the parts 26 and 46 rotate with respect to each other when the flywheel is not driving the shaft 10, leakage of oil is prevented by the seals 50. A suitable seal 52 is likewise provided between the hub 44 and the sleeve 18 on the inboard end of the hub. Lubricant is supplied to the annular cavity 54 between the sleeve 18 and flywheel hub 44 and between the seals 50 and 52 through a lubricant fitting 56. Threaded fastenings 57 or other suitable means secure brake facing material 59 to the opposite faces of brake plate 100. The faces of the clutch plates 58 and 60 are also suitably treated to provide friction contact therebetween.

In operation of the unit, the flywheel 42 normally rotates idly on the sleeve 18 and when its torque is to be transmitted to the shaft 10, the plates of the clutch are engaged to connect the parts in driving relation. The clutch comprises a pair of clutch plates 58 and 60 which are mounted slidably on a radially extending flange 62 integral with the sleeve 18, the said clutch plates being adapted to slide parallel to the shaft axis. A splined connection comprising teeth 64 and 65 of clutch plates 58 and 60 and teeth 61 of flange 62 permits this sliding and yet requires that the said plates rotate as a unit with the sleeve 18. Although only two clutch plates 58 and 60 are shown in Figure 2 of the drawings, the number of these plates may be increased depending on the torque requirements of the particular installation.

That portion of the clutch carried by the flywheel 42 is supported from an axially projecting flange 66 which is bolted through holes 68 of the flywheel and integrally provided with a radially inwardly depending flange portion 70 having an inner radial face 72 forming a part of the clutch. The axially extending part of the overhanging flange 66 is provided with a spline 74 in which are received complementary teeth 75 and 77 of clutch plates 76 and 78 drivingly to connect these clutch plates to flange 66. Certain selected ones of the clutch plates 58, 60, 76 and 78 are provided with friction surfaces so that when all of the plates are held tightly together, a drive is accomplished from the flywheel 42 to the driven shaft 10. Where more than a pair of clutch plates such as 58 and 60 are employed on the sleeve 18, then a correspondingly suitable number of clutch plates similar to clutch plate 76 will be fitted on spline 74 between the additional sleeve clutch plates.

To engage the clutch plates, a cylinder 82 is bolted to the flywheel by series of bolts 84 and 86. Within the cylinder 82, which extends concentrically about the shaft 10, is an annular piston 88 provided with suitable fluid seals 90. Pins 92 (Figures 2 and 5) are provided which are circularly arrayed to slide freely in the flywheel and to engage abuttingly piston 88 and clutch plate 78 at opposite ends thereof. Thus, as fluid under pressure is admitted to the cylinder 82, the piston 88 moves to the left (Figure 2) compressing springs 91 and causing the pins 92 to push the clutch plate 78 toward the depending flange 70, thereby locking together the clutch plates 58, 60, 76 and 78 by sliding them along the splines 64 and 74 respectively into pressure contact with face 72 of flange 70. The friction surfaces of the clutch plates are thus in position to transmit driving torque from the flywheel 42 to the shaft 10. In place of a single annular cylinder and piston unit, in the alternative, a series of cylinder and piston units may be circularly arayed on the flywheel 42 which, when instantaneously energized, may be adapted to act on pins 92 with the same effect as the action of the single annular cylinder and piston unit described hereinabove.

Figure 1:
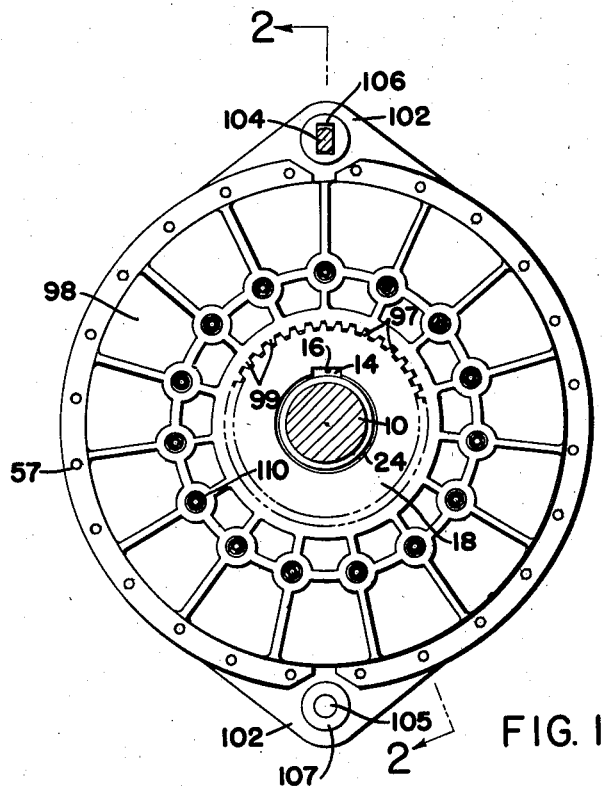
Figure 1 is and end view from the brake end of one form of the invention.

Pins 94 are circularly arrayed to slide freely in the outer portion 96 of sleeve flange 62 between clutch plate 58 and axially slidable sleeve flange 98 so that as the piston 88 moves pins 92 to push the clutch plates into driving engagement, pins 94 are also pushed by clutch plate 58 to slide flange 98 out of engagement with non-rotatably frame mounted brake plate 100. Flange 98 is made axially slidable by means of splined collar 97 of sleeve 18 and splines 99 of flange 98. Brake plate 100 is secured to the frame 12 by means of ears or lugs 102 which are adapted to fit slidably over pins 104 and 105 (Figure 1) integrally secured to the frame 12 and projecting horizontally therefrom in overlapping relationship to flanges 96 and 98. Collars or sleeves 106 and 107 are slidably secured to pins 104 and 105 respectively and carry brake plate 100 thereon. As slidable flange 98 is urged away from brake plate 100 by means of pins 94, braking contact between brake plate 100 and the outer portion 96 of integral flange 62 ceases since any thrust exerted against the brake plate 100 by the integral flange portion 96 will cause the brake plate to slide axially on splined collars 106 and 107 away from said flange portion 96.

A series of annularly disposed springs 110 are secured between integral flange 62 and axially slidable flange 98 which resist the thrust of pins 94. Accordingly, as pressure is released from cylinder 82, springs 110, which have been placed under compression from the thrust of pins 94, urge slidable flange 98 axially inwardly to re-engage brake plate 100 between the slidable flange 98 and the integral flange portion 96. At the same time, pins 94 are pushed axially to the right as seen in Figure 2 by slidable flange 98 which in turn slides clutch plate 58 away from driving engagement with the flange face 72. Springs 91 are also released from compression to retract clutch plate 78 from contact with clutch plate 60 as well as to return piston 88 to its initial position. The gripping of the brake plate 100 between flange 98 and flange portion 96 brakes the rotation of drive shaft 10, and the release of the said clutch plates from driving engagement with flange portion 72 permits the flywheel to rotate idly on sleeve 18.

A bracket or hub cap 112 is secured to cylinder 82 to support pressure fittings provided to energize the piston 88. These fittings comprise a sleeve 114 carried in a ball bearing inner race 116. An outer race 118 is supported and spaced apart from the inner race 116 by ball bearings 120 to hold rotatably the sleeve 114 in a collar 122 integrally secured by means of screws 124 to the hub cap 112, and axially aligned with the drive shaft 10. The collar 122 has a sleeve retaining cap 126 integrally secured to the collar by means of screws 128. An elbow 132 is threadedly fitted to collar 122 and is adapted to connect with the end 134 of a tube 136. The other end 138 of tube 136 is fitted to elbow 140 which is integrally secured to the port 142 in cylinder 82 through which fluid pressure is admitted and exhausted. As many tube connections as desired may be similarly connected between the cylinder 82 and the collar 122. The end 144 of sleeve 114 is adapted to be fitted to suitable valve means and a source of fluid pressure (not shown). An opening 146 is provided in the hub cap 112 in order to permit access to grease fitting 56 for the purpose of servicing the roller bearings 38 and 40 supporting the flywheel 42 on the sleeve 18.

From the foregoing, it is evident that the invention provides a friction drive mechanism which is particularly adaptable for use in combination with a flywheel mounted on an unsupported end of a drive shaft. The mechanism is compactly fitted about the inner and outer faces of the flywheel web so as to conserve space on the shaft and permit the overhanging portion to be of shorter length than hitherto has been possible. This friction drive mechanism also has utility wherever space is at a premium and a compact mechanism is necessary which is at the same time easily serviced and maintained.

It is to be understood that while only one embodiment of the invention is shown herein it is by way of example only and is not to be construed in a limiting sense. Other arrangements and modifications will occur to those skilled in the art and may be resorted to without departing from the scope of the invention.

We claim:

1. In a friction drive assembly for use in a machine having a frame, a shaft journaled in said frame with an unsupported end projecting therefrom, and a flywheel rotatably carried on said unsupported end, the improvement comprising a sleeve fixed to said unsupported end, said flywheel being rotatably mounted on said sleeve, a flange carried on the inside face of the web of said flywheel, a clutch plate slidably carried on said sleeve to drivingly engage said flange, a brake plate non-rotatably secured to said frame, a flange slidably carried on said sleeve to engage said brake plate, and means to simultaneously slide said clutch plate into driving engagement with said flywheel flange and said sleeve flange out of engagement with said brake plate.

2. In a friction drive assembly for use in a machine having a frame, a shaft journaled in said frame with an unsupported end projecting outwardly therefrom, and a flywheel rotatably mounted on said unsupported end, the improvement comprising a sleeve fixed to said unsupported end, said flywheel being rotatably mounted on said sleeve, a cylinder carried on the outside face of said flywheel, a piston in said cylinder, a flange carried on the inside face of said flywheel, a clutch plate slidably carried on said sleeve to drivingly engage said flange, a flange slidably carried on said sleeve, a flange rigidly carried on said sleeve, a brake plate non-rotatably secured to said frame and adapted to be received between and gripped by said slidable and rigid sleeve flanges, and means associated with said piston to simultaneously urge said slidable clutch plate into engagement with said flywheel flange and said slidable sleeve flange away from engagement with said non-rotatable brake plate and said rigid sleeve flange.

3. In a machine having a frame, a shaft journaled in said frame with an unsupported end projecting outwardly therefrom, and a flywheel rotatably mounted on said shaft, the improvement in a friction drive comprising a sleeve fixed to said unsupported end, said flywheel being rotatably mounted on said sleeve, an annular cylinder carried by said flywheel, a piston in said cylinder, a clutch plate carried by said flywheel, a clutch plate carried by said sleeve, a brake plate carried by said frame, a brake plate carried by said sleeve, said clutch and brake plates being in substantially concentric alignment with said annular cylinder, and means connecting said piston to said aligned clutch and brake plates whereby actuation of said piston urges said clutch plates into engagement and simultaneously separates said brake plates.

4. In a machine having a frame, a shaft journaled in said frame with an unsupported end projecting outwardly therefrom, and a flywheel rotatably mounted on said shaft, a friction drive comprising a sleeve fixed to said unsupported end, said flywheel being rotatably mounted on said sleeve, an annular cylinder carried by said flywheel, a piston in said cylinder, a clutch plate carried by said flywheel, a clutch plate carried by said sleeve, a brake plate carried by said frame, a brake plate carried by said sleeve, said clutch and brake plates being in substantially concentric alignment with said annular cylinder, and a series of push rods circularly arrayed for engagement between said piston and said clutch plates, and a second series of push rods circularly arrayed for engagement between said clutch plates, and said sleeve carried brake plate, whereby movement of said piston in one direction urges said clutch plates into driving engagement and disengages said brake plates.

5. In a machine having a frame and a flywheel driven shaft rotatably journaled therein said shaft having an unsupported end projecting outwardly from said frame, the improvement in a friction drive assembly comprising a sleeve fixed to said shaft, a flywheel rotatably mounted on said sleeve, a clutch plate and a brake plate each axially slidably mounted on said sleeve, a brake plate carried by said frame and axially slidable thereon, a clutch plate carried by said flywheel and axially slidable thereon, an annular cylinder carried on the face of said flywheel remote from said frame, a piston within said cylinder adapted to drivingly engage said clutch plates, means to actuate said piston comprising a pressure fitting, a swivel connection between said fitting and said cylinder, and a non-rotating connection between said fitting and a source of fluid pressure.

6. In a machine having a frame and a flywheel driven shaft rotatably journaled therein said shaft having an unsupported end projecting outwardly from said frame, the improvement in a friction drive assembly comprising a sleeve fixed to said shaft, a flywheel rotatably mounted on said sleeve, a clutch plate and a brake plate each axially slidably mounted on said sleeve, a brake plate carried by said frame and axially slidable thereon, a clutch plate carried by said flywheel and axially slidable thereon, an annular cylinder carried on the face of said flywheel remote from said frame, a piston within said cylinder adapted to drivingly engage said clutch plates, means to actuate said piston comprising a bracket secured to said face of said flywheel, a non-rotatable pressure fitting carried by said bracket in axial alignment with said shaft and connectable to a source of fluid pressure, a rotatably pressure fitting rotatably sealed and secured to said non-rotatable fitting, and connecting means between said rotatable fitting and said cylinder.

7. In a machine having a frame and a flywheel driven shaft journaled thereon, a friction clutch and brake assembly comprising a sleeve keyed to said shaft and having a radial flange projecting therefrom, a flywheel rotatably mounted on said sleeve and spaced axially from said flange, a fluid actuated annular cylinder and piston assembly carried concentrically on the face of said flywheel web remote from said frame, an annular flange carried concentrically on the near face of said flywheel web to project horizontally toward said frame and then radially inwardly toward said sleeve, a plurality of axially slidable clutch plates secured to said annular flange, a plurality of axially slidable clutch plates secured to said sleeve and alternately interposed between said flange secured clutch plates, a plurality of circularly arrayed clutch plate push rods slidably passing through apertures in said web to engage an adjacent annular flange supported clutch plate on one side of said web and to engage said piston on the other side of said web, an axially slidable brake plate secured to said sleeve, an axially slidable brake plate secured to said frame and concentrically interposed between said sleeve secured brake plate and said sleeve radial flange, spring means secured in compression between said sleeve secured brake plate and said sleeve radial flange, a plurality of circularly arrayed brake plate push rods slidably passing through apertures in said radial flange to engage at one end said sleeve secured brake plate and at the opposite end an adjacent sleeve secured clutch plate, and pressure means connected to said cylinder to force said piston axially toward said frame, whereby said clutch plates are pressed together between said clutch plate push rods and said flywheel annular flange, said brake plate push rods move said sleeve secured brake plate axially away from said frame secured brake plate and said springs re-engage said frame secured brake plate between said sleeve secured brake plate and said sleeve radial flange when the pressure in said cylinder is released.

8. In a machine having a frame and a flywheel driven shaft rotatably journaled therein, the improvement in the frictional drive assembly comprising: a sleeve secured to said shaft; a flywheel rotatably mounted on said sleeve; a clutch plate and a brake plate each axially slidably mounted on said sleeve; a brake plate carried by said frame and axially slidable thereon; a clutch plate carried by said flywheel and axially slidable thereon; an annular cylinder mounted on said flywheel; a piston within said cylinder adapted drivingly to engage said clutch plates; means to actuate said piston comprising a bracket secured to the face of said flywheel; a swivel pressure fitting carried by said bracket in axial alignment with said shaft; and external connecting means between said swivel and said annular cylinder.

9. In a machine having a frame and a shaft journaled in said frame with an unsupported end projecting beyond said frame, the improvement in a friction drive comprising: a sleeve fixed to said unsupported end; a flywheel rotatably mounted on said sleeve; an annular cylinder mounted on the web of said flywheel remote from said frame; an annular piston in said cylinder; clutch plate means carried by said flywheel on the side adjacent said frame; clutch plate means carried by said sleeve; brake plate means carried by said frame; brake plate means carried by said sleeve; connecting means between said piston and said clutch plate means; connecting means between said clutch plate means and said brake plate means; and fluid pressure means operatively connected to said piston, whereby actuation of said piston moves said connecting means to urge said clutch plates into engagement and to release said brake plates from engagement.

References Cited in the file of this patent

UNITED STATES PATENTS

| 2,095,094 | Glasner | Oct. 5, 1937 |
| 2,205,989 | Meyers et al. | June 25, 1940 |
| 2,441,543 | Longfield | May 11, 1948 |
| 2,667,248 | Wissman | Jan. 26, 1954 |

FOREIGN PATENTS

| 544,104 | Great Britain | Mar. 27, 1942 |
| 869,715 | Germany | Mar. 5, 1953 |